June 2, 1964  H. M. SEARS  3,135,899

MAGNETIC WORK-HOLDING TABLE

Filed Dec. 19, 1960

INVENTOR.
HARTLEY M. SEARS
BY
Miketta and Glenny
ATTORNEYS.

United States Patent Office 3,135,899
Patented June 2, 1964

3,135,899
MAGNETIC WORK-HOLDING TABLE
Hartley M. Sears, Laguna Beach, Calif., assignor to The Hartley Co., Costa Mesa, Calif., a corporation of California
Filed Dec. 19, 1960, Ser. No. 76,965
8 Claims. (Cl. 317—159)

This invention relates to a magnetic work-holding table in which magnetic flux is most effectively utilized and a method of varying the magnetic holding strength of the table in a simple and easy manner. More particularly, my invention relates to a work-holding table employing a novel arrangement of ferromagnetic flux-receiving faces, magnetic pole elements and permanent magnets. My invention further relates in particular to a method of varying the effective pole strength of ferromagnetic pole elements in the table surface by novel disposition of permanent magnets relative to flux-receiving face elements in a zone of low flux density wherein magnetic flux of high density is selectively supplied to the work-holding table surface, thereby attaining high holding power, by ready and unimpeded movement of the permanent magnets in the zone of low flux density.

Magnetic chucks or work-holding devices in which the work-holding force is provided by permanent magnets, have in the past depended on moving a rigid assembly of permanent magnets in sliding contact with associated pole pieces to provide the "on-off" or "hold" and "release" operation of the device. These sliding pole pieces have had a high magnetic flux density where they contact the stationary work-holding plate which results in strong attractive forces and consequent high friction. In an effort to minimize the destructive effects of friction and to make the manual movement of the magnet assembly easier, much attention has been directed previously to narrow gap, non-rubbing pole pieces with the entire magnet assembly supported slidably or rotatably on fixed guides, suitable anti-friction bearings or other bulky and expensive mechanical arrangements.

The gap between a pole piece (or magnet pole) and the work-holding plate had to be kept very small (.001 to .003 inch) so as not to cause a great loss of available magnetic flux for work-holding. Such narrow gaps required precise machining of all associated elements and were subject to change and eventual failure due to wear of the magnet assembly supporting means.

By a novel arrangement of permanent magnets and pole pieces, the hereinafter described device eliminates entirely the need for close machining, expensive bearing arrangements or force multiplying linkages to move the magnet assemblies.

It is therefore an object of my invention to disclose and provide a magnetic work-holding table and a method of operation thereof wherein the work-holding elements of the table are selectively supplied with magnetic flux of high density such that high work-holding strength is attained and wherein movement of permanent magnets to selectively vary that holding strength is accomplished by a minimum of effort.

It is another object of my invention to disclose and provide a magnetic work-holding table and method of operation thereof wherein the permanent magnets employed may be loosely positioned relative to the table, without expensive gap producing constraints and which are easily movable relative to the table.

It is a further object of my invention to disclose and provide a magnetic work-holding table and method of operation thereof wherein the work-holding table is selectively supplied with magnetic flux of high density by movement of permanent magnets in a zone of low flux density.

Generally stated, my invention comprises the provision of an array of parallel, spaced ferromagnetic pole pieces of generally rectangular cross section having large flux-receiving faces and smaller pole end faces. The pole pieces are fixed in a non-magnetic frame with the flux-receiving faces presenting a plurality of paired, opposing faces in parallel rows and the pole end faces lying in a common plane to provide a work-holding surface.

The pole pieces may be further arranged in a longitudinally extending array of transversely oriented rows of pole pieces where the pole pieces of each row are disposed in spaced parallel planes lying parallel to the longitudinal extent of the array. The pole end faces of the pole pieces in each individual row may also be magnetically interconnected by a pole strip extending transversely of the array parallel to the row.

A plurality of flat wafer-like permanent magnets are mounted on a carrier assembly and adapted to slide loosely between opposed flux-receiving faces back and forth between a hold position where the magnet pole faces are aligned with opposed flux-receiving faces and a release position where the faces are in substantial disalignment. The flat wafer-like permanent magnets are provided with a width approximately equal to the width of the ferromagnetic pole strips (when they are employed or to the cross sectional length of the pole pieces when pole strips are not employed), a thickness somewhat less than the spacing between the paired, opposed flux-receiving faces in parallel rows, and a height to suit the dimensions of the frame. The permanent magnet wafers are magnetized in the direction of their thickness so that they supply flux from their large faces to the large flux-receiving faces, the flux-density being relatively low over these large surfaces. The air gap between adjacent magnet pole faces and the ferromagnetic pole piece flux-receiving faces may therefore be raised to limits which make possible the assembly of pressed and sintered magnet wafers without the necessity of grinding them to precise dimension. When the magnets are aligned with the flux-receiving faces of the pole pieces, however, the flux-density at the pole end pieces is relatively very high such that the magnetic holding power of the pole ends, forming a work-holding surface, is very high.

One of the characteristics of the present invention, in addition to the ease with which the work table is turned on and off, is the ability of the table to generate an extremely high work-holding force (per unit area) with a plurality of small permanent magnets.

It can therefore be seen that the magnets may be easily moved in a zone of low flux density to vary the pole strength of the pole pieces selectively supplying magnetic flux of high density at the pole ends. Since the holding power of a magnet is directly proportional to the square of the flux density, the attraction of a work piece to the table while the small pole ends are supplied with magnetic flux of high density will be great. The attraction of the large magnets pole faces to the large flux-receiving faces in the zone of low flux density will therefore be small.

Furthermore, since the wafer-like magnets are disposed between opposed flux-receiving faces, the forces on them are virtually balanced, resulting in insignificant frictional forces attributable to magnetic attraction between the loosely positioned magnets and the flux-receiving faces of the pole pieces.

When the pole end faces of the pole pieces of an individual row of pole pieces are interconnected by a pole strip, the flux is concentrated from all the pole pieces of a row into the pole strip where it is contacted by a work piece. Each successive pole strip may be provided with a polarity opposite to that of the adjacent strips by novel arrangement of the permanent magnets.

My invention will be more completely disclosed and described by the following detailed description of exemplary embodiments, further objects and advantages becoming apparent with such disclosure, and reference will be made to the appended sheets of drawings wherein.

Figure 1:
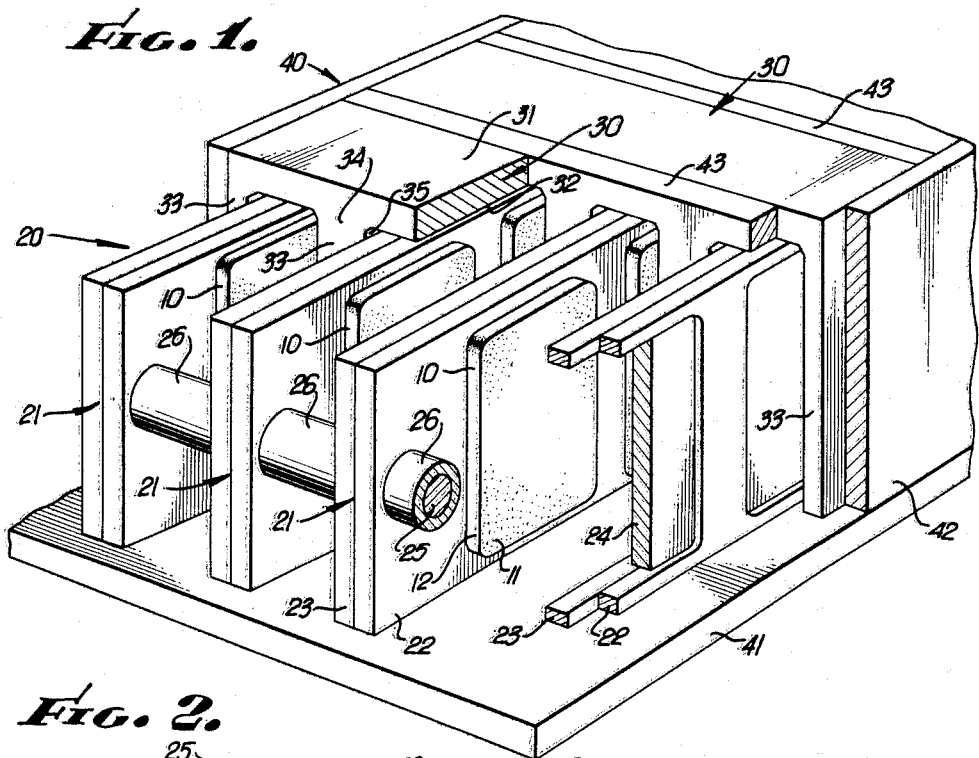
FIG. 1 is a perspective view of an exemplary embodiment of a magnetic work-holding table, according to my invention, with portions thereof cut away to more clearly show its construction, and with the magnets in "release" position.

Referring now particularly to FIG. 1, an exemplary embodiment of a magnetic work-holding table, according to my invention, is shown with a plurality of permanent magnets 10 disposed on a carriage assembly 20 for slidable movement relevant to stationary pole strips 30 fixedly mounted in a frame 40.

Permanent magnets 10 are preferably wafer-like ceramic permanent magnets, though they may also be made of metallic alloys such as "alnico" permanent magnets. Ceramic-type magnets of the mixed ferrite type are preferred however for their improved magnetic properties, lighter weight and economy. Ceramic magnets are very resistant to demagnetization, have high coercive force values and high maximum energy products. Barium ferrite type ceramic magnets, having the empirical formula $BaFe_{12}O_{19}$ and a coercive force of about 1600 oersteds, a residual induction of about 2000 gauss after the application of an applied field of 10,000 oersteds, and a permeability of less than 2 are preferred.

Ceramic magnets are further preferred in that they may be readily provided in flat wafer-like forms magnetized in the direction of their thickness such that the large flat side surfaces constitute the magnetic poles of the magnet. As seen in FIG. 1, the permanent magnets 10, of the ceramic type, are provided in flat wafer-like form and have large oppositely facing magnetic pole side faces 11 and narrow edge surfaces 12.

The permanent magnets 10 are mounted in spaced carriers 21 which are a part of the carrier assembly 20 capable of being easily moved relative to the pole strips 30.

The pole strips 30 are fixedly held in parallel spaced relation within a non-magnetic or magnetically transparent frame 40. Frame 40 may be made of brass and comprise a base 41, longitudinally extending sides 42 and a framework of laterally extending spacer bars 43. Pole strips 30 are preferably of high permeability and may be made of soft iron. Each pole strip 30 has an upper work-holding surface 31, and a lower surface 32. Upper surfaces 31 lie in a common plane and form a work-holding table surface. They may be flush with the spacer bars 43. The pole strips 30 are thus held by the frame 40 and supported on the base 41 in magnetically isolated relation and are adapted to hold a work piece of magnetically attractable material upon the surface of the table, each strip 30 being of opposite polarity from the adjacent strips when the magnets are set in hold position as explained subsequently.

A plurality of pole pieces 33, preferably of elongated rectangular section, are cooperatively related to each pole strip 30 and extend downwardly, in one direction from the lower surface 32.

Pole pieces 33 may be unitary or integral with the strips 30, wherein they merge with lower surface 32 in a pole end area or zone 34, or may be provided separately, wherein they each have a pole end face in contact with the strip in such zone. The pole pieces 33 are further oriented, opposed and spaced from each other in parallel planes transverse to the pole strips 30 and normal to the work-holding surfaces 31. They are also in magnetic contact with the lower surface 32 of the pole strip. Each pole piece 33 has two large, spaced parallel flux-receiving faces 35 in addition to the pole end zone or face 34.

If desired, one of the non-magnetic sides 42 of frame 40 may be removed to allow the outside surfaces of the pole pieces 33 at that side to act as a vertical, side work-holding surface or table.

The width of the pole strips 30 is preferably equal to or greater than the width of the spacer bars 43. The wafer-like magnets 10 are preferably of a width equal to or greater than the width of the pole strips 30 and their associated flux-receiving faces 35.

Therefore, the parallel pole strips 30 present a plurality of opposed, spaced and parallel flux-receiving faces, there being a longitudinally extending array of individual rows of paired opposed flux-receiving faces. The magnets 10 are disposed so they may be loosely and readily slidably moved relative to the flux-receiving faces 35 and in planes parallel to such faces by means of a carriage assembly indicated generally at 20.

Figure 2:
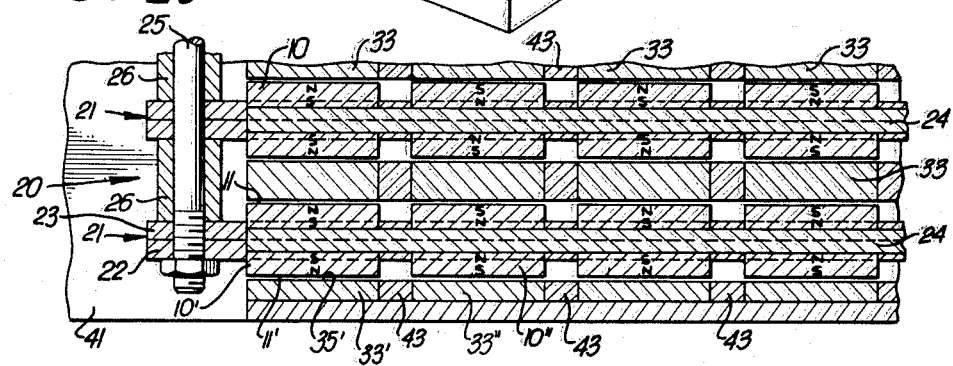
FIG. 2 is a plan view of a portion of the work-holding table of FIG. 1 with the top surface removed to show the internal construction in detail, and with the magnets in "hold" position.

The carriage assembly 20, comprises a plurality of individual carriers 21 and is adapted to be moved from a hold position into a release position and vice versa. Referring to FIG. 1, the carriage assembly 20 is shown in the release position, with the magnets 10 disaligned with adjacent flux-receiving faces 35. FIG. 2, shows the carriage 20 moved to hold position with the magnets 10 aligned and in register with the adjacent flux-receiving faces 35.

Each carrier 21 may comprise two cage elements 22 and 23 which fit together about a centrally disposed circuit bar 24. The cage elements 22 and 23 are made of non-magnetic material, have a series of magnet-receiving apertures therein and serve to separate the permanent magnets 10 which hold themselves upon the circuit bar 24 by their magnetic attraction thereto, bar 24 being made of ferromagnetic material. Bar 24 also serves as part of the magnetic circuit as explained subsequently. Magnets 10 are placed on both sides of each carrier 21 and are held in spaced, opposed and parallel relation by the cage elements 22 and 23. The magnets may be held in such spaced, opposed and parallel relation between raised ridges or in shallow impressions formed in the circuit bar 24 since they are attracted to the magnetic material of the circuit bar 24.

Figure 3:
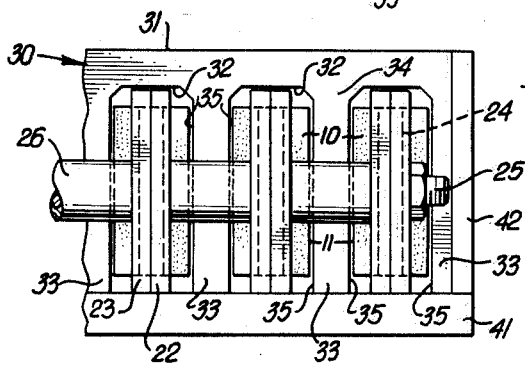
FIG. 3 is a frontal view of a portion of the work-holding table of FIG. 1 to show the disposition of the permanent magnets.

The magnets 10 are placed upon the carriers 21, as shown in FIG. 2, such that magnetic pole side surfaces 11 of similar polarity are presented to the opposed flux-receiving faces 35 of any one pole strip 30. The polarity of the so-aligned faces 11 alternates longitudinally along each carrier portion 21 so that the polarity of successive pole strips 30 alternates between S and N when the carriage assembly 20 is in position as shown in FIG. 2. As seen in FIG. 3, the side surfaces 11 of the magnets 10 are parallel to and slide between opposed flux-receiving faces 35 on the carriers 21; an appreciable gap may exist between each face 35 and surface 11 so that there are no problems involving friction. The distance separating the outer faces 11 of the magnet placed back to back on each carrier 21 is less than the space between opposing cooperating flux receiving surfaces 35 of the adjacent pole pieces 33, so that each face is spaced from its cooperating surface 35 by between about 0.001 inch and about 0.030 inch to permit ready movement without abrasion or sliding contact.

Means for concurrently moving the individual carriers or portions 21 together as an assembly are provided in the form of a connector bar 25 with spacer collars 26, which may be operated with a handle, not shown, or similar manually operable mechanism to selectively move the carriers longitudinally into hold and release positions.

The operation of the magnetic work-holding table may be understood by referring to FIG. 2. When the carriage assembly 20 and permanent magnets 10 are in the hold position, as shown in FIG. 2, the magnetic flux of the permanent magnets may flow between successive pole strips 30 to hold a work piece crossing the work holding surfaces of said strips. Starting with magnet 10', for instance, flux flows from the outwardly directed face 11' of polarity N into the adjacent large flux-receiving face 35' of pole piece 33'. The flux density here is relatively low. The circuit continues through pole piece 33' into the associated pole strip 30 (not shown in FIG. 2), the entire strip having a polarity N due to the joint effect of all the magnets 10 in that row, on through the work piece and into the next pole strip of the strip 30 assuming the work piece is bridging such strips. Such next pole strip is of polarity S. The flux thereafter passes into pole piece 33" and to magnet 10" having an outwardly directed pole face of S. polarity. The magnetic circuit is then completed by the flow of flux back to magnet 10' through circuit bar 24. Therefore, each magnet 10 in effect acts as a return path for the flux of another, a plurality of primary magnetic circuits being formed wherein the flux of low density between the magnets 10 and adjacent flux-receiving faces is directed into the pole strips and concentrated there. The density of flux flowing between the strips 30 and a work piece held thereon is great for the flux of all the individual primary circuits is concentrated by the strips 30 into the areas of contact between the work piece and strips 30. The holding power of the magnetic work-holding table is directly proportionate to the square of the flux-density and is thus greatly increased by this arrangement of the magnets 10 and pole pieces 33 relative to the strips 30. Furthermore, even with this great holding strength, the magnets 10 may be readily moved with a minimum of physical effort, such movement occurring in a zone of low flux density between the magnets 10 and the flux-receiving faces 35.

When the magnets 10 and carriage assembly 20 are moved into the release position of FIG. 1 the magnetic flux is shunted through the pole pieces 33 and bypasses the work-holding strips 30, and the work piece thereon, in an auxiliary circuit. This occurs due to the contact of each pole piece by two magnet pole faces of opposite polarity so that the flux of each magnet can shortcircuit through a pole piece to the next magnet on the carrier 21 and return through the circuit bar 24. Neutralization of the polarity of each strip 30 therefore occurs because magnets of different polarity are in partial alignment therewith. Since primary flux may still permeate the work piece being held on the table even after moving the magnets from hold position and the pole strips 30 may therefore not be completely neutralized, the carriage 20 may be adapted to be moved even further out of hold position past the release position of FIG. 1 to in effect reverse the polarity of the pole strips. The work-piece may then be readily removed.

The work-holding table of my invention, therefore, has many advantages, i.e., all sliding parts may be very lightly loaded, no destructive friction is encountered and the magnets 10 may be slidably moved to and from hold position without much effort. The soft iron pole pieces extend from the top work-holding surface to the base, making an unusually sturdy work-holding table having a high load carrying capacity. Of equal importance is the fact that there is therefore, little, if any, surface deflection due to the weight of the work piece or due to magnetic pull, which might distort the planar surface of the work table.

Since no close tolerances are required, the table parts may be easily made by casting or sintering operations and assembled without expensive machining operations.

The embodiment of work-holding table and the arrangement of permanent magnets employed therewith as disclosed and explained in detail herein is intended to be exemplary in character only and it should be understood that further modifications, alterations and embodiments may be made within the scope of my invention, as defined by the following claims.

I claim:

1. A magnetic work-holding device including a plurality of permanent magnets, said device being characterized by ease of movement of the magnets to and from "release" and "hold" positions and by great holding power when said magnets are in the hold position, comprising: an array of ferro-magnetic work-holding pole strips in magnetically isolated spaced parallel relationship, each strip having a work-holding pole face, said faces lying in a common plane providing a work-holding surface, and a plurality of integral pole pieces extending in one direction from each said strip, said pole pieces lying in parallel spaced planes traverse to said strips and normal to said work-holding pole face, said pole pieces presenting a plurality of opposed planar flux-receiving faces between adjacent pole pieces on each of said strips; a movable carrier extending in slidable relation to each of said strips, said carrier having portions thereof slidable between said opposed flux-receiving faces of said pole pieces; and a plurality of wafer-like ceramic permanent magnets magnetized in a direction normal to their thickness, each of said magnets having large oppositely facing magnetic pole side surfaces and smaller edge surfaces, said magnets being disposed on said movable carrier with said side surfaces parallel to said flux-receiving faces and slidable between opposed flux-receiving faces with said movable carrier, said magnets being further oriented on said carrier to present side surfaces of similar polarity toward opposed flux-receiving faces of the pole pieces of an individual work-holding pole strip but of opposite polarity as between strips, the successive work-holding pole strips being of opposite polarity to each other when said carrier is moved into a hold position wherein said magnets are in substantial registry with corresponding flux-receiving faces.

2. A device as in claim 1 wherein the carrier includes a ferro-magnetic circuit bar and said magnets are disposed on each side of said circuit bar, the side surfaces of said magnets being in loosely sliding relation to the opposing flux-receiving faces of the adjacent pole pieces.

3. A readily and selectively energizable magnetic work-holding device, comprising: an array of elongated, parallel, ferro-magnetc work-holding strips magnetically insulated from each other, said strips having upper faces in a common plane forming a work-holding surface and a lower surface; a plurality of pole pieces in spaced, parallel planes transverse to each work-holding strip and in magnetic contact with the lower surface of each work-holding strip, adjacent pole pieces associated on each of said strips presenting opposing and spaced flux-receiving faces; a plurality of movable carriers beneath said work-holding strips, each carrier extending beneath said strips between adjacent pole pieces on each of said strips for sliding movement transverse to said strips; each carrier being provided on each side thereof with a plurality of spaced wafer-like ceramic magnets having magnetic pole surfaces in planes parallel to the flux-receiving faces of said pole pieces; and means for concurrently moving said carriers transversely to said strips to place the magnetic pole surfaces of the magnets into and out of substantially complete registry with the flux-receiving faces.

4. A readily and selectively energizable magnetic work-holding device comprising: a work-holding surface comprising an array of elongated ferro-magnetic work-holding pole strips, said strips being magnetically insulated from each other; each strip having a plurality of spaced parallel integral pole pieces extending in one direction from said strip and lying in parallel spaced planes traverse to said strip, adjacent pole pieces on each of said strips presenting opposed planar flux-receiving faces; a plurality of wafer-like permanent magnets disposed between and parallel to said opposed planar flux-receiving faces; and means for slidably mounting said magnets for sliding motion relative to said faces, wherein said work-holding strips are wider than the magnetically insulated spacing between said strips and the ceramic magnets are of substantially the same width as the strips.

5. In a magnetic work-holding device the provision of: a pair of ferro-magnetic pole pieces of elongated rectangular section in spaced, magnetically isolated relation, each pole piece having a large planar flux-receiving face and an integral end pole face, the flux-receiving faces being in parallel spaced relation and the end pole faces being in common plane to provide a work-holding surface; a magnetic carrier slidably disposed between said flux-receiving faces for sliding motion relative to said pole pieces in a plane parallel to said faces; a pair of permanent magnets having large generally flat oppositely facing side surfaces and narrow edge surfaces; and means for mounting one of said pair of magnets on each side of said magnetic carrier with outer side surfaces parallel to said flux-receiving faces, said outer side surfaces being magnetic poles of similar polarity, said magnets being magnetized in a direction normal to said side surfaces.

6. In a magnetic work-holding device including a plurality of ceramic permanent magnets of flat wafer-like shape magnetized in a direction normal to their thickness, the provision of: a plurality of spaced parallel pole pieces having large flux-receiving side faces and smaller pole end faces lying in a common plane adapted to provide a work-holding surface, each of said flux-receiving faces being spaced from and parallel to another opposed flux-receiving face of an adjacent pole piece; a magnet carrier of ferro-magnetic material having portions adapted to slide between said opposed flux-receiving faces in a direction parallel to said faces; and a plurality of wafer-like ceramic permanent magnets carried on each side of said carrier, each magnet having oppositely facing large side surfaces constituting opposite magnetic poles of the magnet, said magnets being oriented on each side of said carrier to present large magnetic pole side surfaces of similar polarity toward opposed flux-receiving faces.

7. A magnetic work-holding device comprising:
a plurality of ferro-magnetic work-holding strips magnetically insulated from each other and providing a work-holding surface;
a plurality of ferro-magnetic pole pieces associated with each of said work-holding strips, each of said pole pieces having oppositely directed planar flux-receiving faces lying transversely of said strips and adjacent pole pieces on each strip being spaced to receive permanent magnets therebetween;
carriage means for mounting permanent magnets including magnet carrier portions to extend and mount permanent magnets between opposed flux-receiving faces provided by said spaced adjacent pole pieces on each of said work-holding strips;
carriage supporting means for slidably supporting said carriage means for selectable movement transversely of said work-holding strips with said carrier portions slidable between pole pieces on each of said work-holding strips;
a plurality of wafer-like ceramic permanent magnets magnetized in a direction normal to their thickness mounted on said carriage means, each of said magnets having large oppositely facing magnetc pole side surfaces and smaller edge surfaces and being disposed on said carriage means magnet carriers to present side surface of similar polarity toward opposed flux-receiving faces of adjacent pole pieces on each of said work-holding strips but of opposite polarity as between adjacent strips when said carriage means is moved to a hold position wherein said magnets are in substantial registry with said flux-receiving faces.

8. The device of claim 7 wherein said carrier positions comprise a centrally disposed circuit bar of ferro-magnetic material and means for maintaining said magnets in a predetermined spaced relationship upon said bar.

References Cited in the file of this patent

UNITED STATES PATENTS

| 2,884,572 | Maynard | Apr. 28, 1959 |
| 2,947,921 | Watelet | Aug. 2, 1960 |
| 3,079,535 | Schultz | Feb. 26, 1963 |

FOREIGN PATENTS

| 1,032,441 | Germany | June 19, 1958 |